(12) United States Patent
Fukutani

(10) Patent No.: US 9,071,156 B2
(45) Date of Patent: Jun. 30, 2015

(54) SWITCHING POWER SUPPLY DEVICE AND IMAGE FORMING APPARATUS WITH SWITCHING POWER SUPPLY DEVICE

(75) Inventor: Takayuki Fukutani, Meridian, ID (US)

(73) Assignee: Canon Kabushiki Kaisha, Toykyo (JP)

( * ) Notice: Subject to any disclaimer, the term of this patent is extended or adjusted under 35 U.S.C. 154(b) by 162 days.

(21) Appl. No.: 13/298,082

(22) Filed: Nov. 16, 2011

(65) Prior Publication Data

US 2012/0134705 A1 May 31, 2012

(30) Foreign Application Priority Data

Nov. 30, 2010 (JP) ................. 2010-267289

(51) Int. Cl.
*G03G 15/00* (2006.01)
*H02M 3/335* (2006.01)
*H02M 7/44* (2006.01)
*H02M 1/00* (2007.01)

(52) U.S. Cl.
CPC ...... *H02M 3/33569* (2013.01); *H02M 3/33523* (2013.01); *H02M 3/33507* (2013.01); *H02M 2001/0058* (2013.01); *Y02B 70/1491* (2013.01); *Y02B 70/1433* (2013.01)

(58) Field of Classification Search
CPC ..................... H02M 3/33507; H02M 3/33523
USPC ................... 399/88; 363/21.02, 97
See application file for complete search history.

(56) References Cited

U.S. PATENT DOCUMENTS

| | | | |
|---|---|---|---|
| 6,396,716 B1 * | 5/2002 | Liu et al. .................. | 363/17 |
| 2002/0131788 A1 * | 9/2002 | Nakaya ..................... | 399/88 |
| 2008/0266908 A1 * | 10/2008 | Halberstadt .............. | 363/21.02 |
| 2010/0033998 A1 * | 2/2010 | Halberstadt .............. | 363/97 |

FOREIGN PATENT DOCUMENTS

| | | |
|---|---|---|
| CN | 1732614 A | 2/2006 |
| JP | 2005-198457 A | 7/2005 |
| JP | 2007-006614 A | 1/2007 |
| KR | 10-2008-0047809 A | 5/2008 |
| WO | 2008132512 A1 | 11/2008 |

* cited by examiner

*Primary Examiner* — David Gray
*Assistant Examiner* — Tyler Hardman
(74) *Attorney, Agent, or Firm* — Canon U.S.A., Inc., IP Division

(57) ABSTRACT

A current resonance type switching power supply device controls an ON/OFF operation of two switching elements according to an amount of change in voltage of a current resonance capacitor.

14 Claims, 12 Drawing Sheets

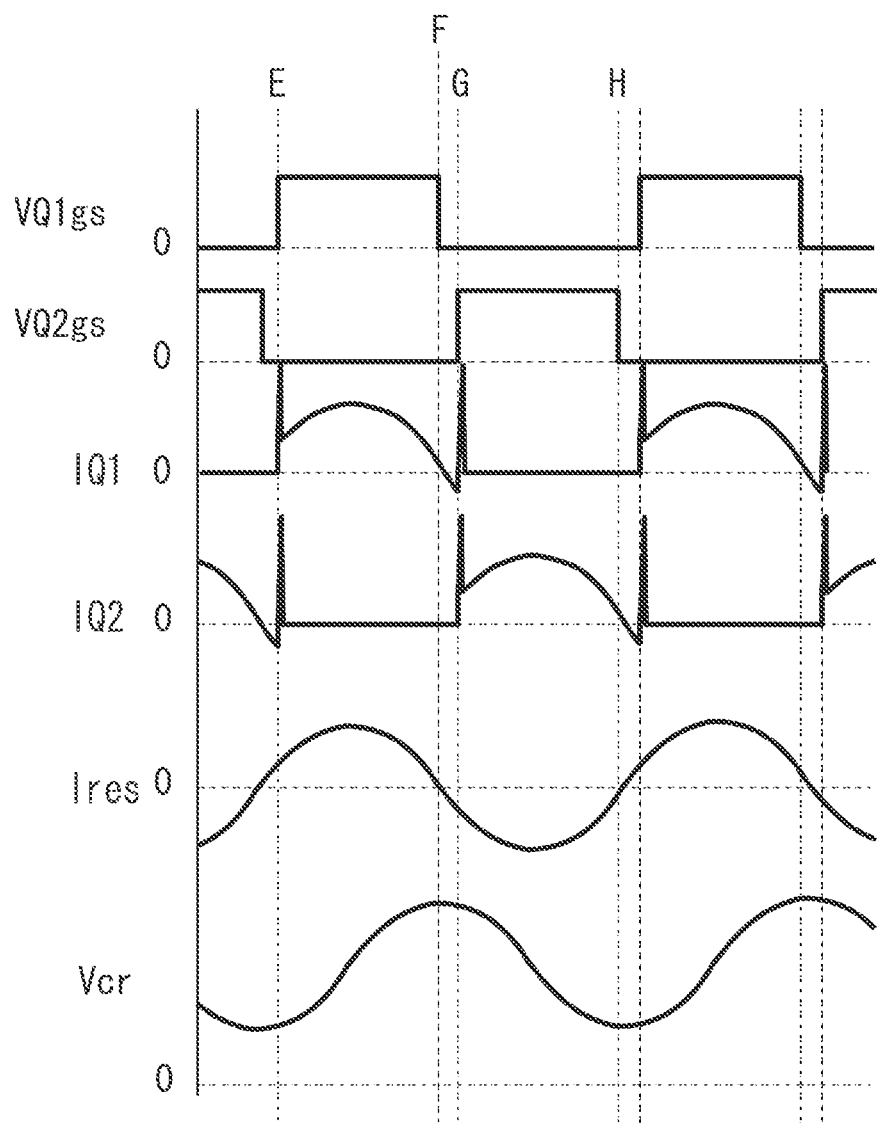

SWITCHING POWER SUPPLY DEVICE AND IMAGE FORMING APPARATUS WITH SWITCHING POWER SUPPLY DEVICE

BACKGROUND OF THE INVENTION

1. Field of the Invention

The present invention relates to a current resonance type switching power supply device, more particularly to a switching power supply device which prevents a through current from flowing through switching elements when the switching power supply device is overloaded.

2. Description of the Related Art

FIG. 6A illustrates a circuit configuration of a conventional current resonance type switching power supply device. Referring to FIG. 6A, a full-wave rectifying circuit 2 rectifies alternating-current (AC) voltage from a commercial AC power supply 1 and outputs the voltage rectified by the full-wave rectifying circuit 2 to a smoothing capacitor 3. The smoothing capacitor 3 smoothens the full-wave rectified voltage output from the full-wave rectifying circuit 2, and outputs a direct-current (DC) voltage Vdc.

A series circuit constituted of two switching elements, complementary metal-oxide semiconductor field-effect transistors (MOSFETs) 8 and 9 (hereinafter, the MOSFET 8 is referred to as a high side FET 8 and the MOSFET 9 is referred to as a low side FET 9) is connected to both ends of the smoothing capacitor 3.

A transformer 11 is connected in parallel to the low side FET 9. The primary winding of the transformer 11 is expressed equivalently by an excitation inductance 12 and a leakage inductance 13. The leakage inductance 13 and a current resonance capacitor 14 constitute a series resonance circuit.

The leakage inductance 13 may be configured separately from the transformer 11. A voltage resonance capacitor 10 is connected in parallel to the low side FET 9.

The secondary winding of the transformer 11 is formed of two coils each having a different phase, one of which is wound to generate a common mode voltage to the primary winding, and the other one of which is wound to generate a reverse phase voltage to the primary winding. To the secondary winding of the transformer 11, a rectification and smoothing circuit constituted of a diode 15A, a diode 15B, and a smoothing capacitor 16, and a load resistor 17 (which indicates a connected load) are connected.

This rectification and smoothing circuit full-wave rectifies and smoothens a voltage (pulse voltage ON/OFF controlled) induced in the secondary winding of the transformer 11 to output a DC output voltage Vout to the load resistor 17.

The DC output voltage Vout is input to an error amplifier in a shunt regulator 19. The error amplifier compares the Vout with a reference voltage, and supplies an error signal corresponding to the value of the detected error to a photo-coupler 21. The photo-coupler 21 feeds back the error signal from the secondary winding to the primary winding with insulation between the primary and secondary windings maintained. A resistor 20 is a limiting resistor inserted to limit a current supplied to the light emitting diode (LED), which is a light emitting element, in the photo-coupler 21.

A control circuit 7 changes the oscillation frequency of an oscillator (not illustrated) incorporated in the control circuit 7 according to the value of a current flowing through a photo transistor, which is a light-receiving element of the photo-coupler 21. When the oscillation frequency of the oscillator is changed, the switching frequencies of the high side FET 8 and the low side FET 9 change, so that the amount of energy transmitted from the primary winding to the secondary winding also changes.

As a result, the value of the DC output voltage Vout output from the secondary winding is controlled variably. The control circuit 7 provides each gate terminal of the high side FET 8 and the low side FET 9 with a period (dead time) when no voltage is applied thereto to control the voltage, and controls both the FETs 8 and 9 to turn on/off alternately while prohibiting both of them from turning on at the same time.

In such a current resonance type switching power supply device, the control circuit 7 performs control so that, as the DC output voltage Vout from the secondary winding drops, the switching frequency decreases. Consequently, the amount of energy transmitted to the secondary winding is increased. Conversely, when the DC output voltage Vout of the secondary winding rises, the control circuit 7 controls the switching frequency to increase so as to reduce the amount of energy transmitted to the secondary winding.

FIG. 6B illustrates the detail of a resonance circuit section on the primary winding side of the transformer in FIG. 6A. As illustrated in FIG. 6B, the high side FET 8 contains a parasitic diode (or body diode) D1 and the low side FET 9 contains a parasitic diode (or body diode) D2.

FIG. 7A illustrates an operation waveform of the circuit in FIG. 6B. In FIGS. 7A and 7B, symbol $VQ1gs$ indicates a gate signal for driving the high side FET 8, symbol $VQ2gs$ indicates a gate signal for driving the low side FET 9, symbol IQ1 indicates a current flowing through the high side FET 8, symbol IQ2 indicates a current flowing through the low side FET 8, symbol Ires indicates a current flowing through the resonance circuit, and symbol Vcr indicates a voltage between both ends of the current resonance capacitor 14.

First, an operation of the circuit in a state where its input voltage and a load current are stabilized (steady time) will be described with reference to FIG. 7A. In a period A when the high side FET 8 is ON and the low side FET 9 is OFF, a current flows from the high side FET 8 to the leakage inductance 13 to the current resonance capacitor 14.

Energy is stored in the current resonance capacitor 14 via the excitation inductance 12 of the primary winding of the transformer 11 and the leakage inductance 13, and consequently a voltage applied between both ends of the current resonance capacitor 14 rises.

Next, in a dead time period B when both the high side FET 8 and the low side FET 9 are OFF, a current flows from the body diode D2 of the low side FET 9 to the leakage inductance 13 to the current resonance capacitor 14.

A zero-voltage switching (hereinafter referred to as ZVS) is achieved by turning ON the low side FET 9 when a current is flowing through the body diode D2.

Next, in a period C when the high side FET 8 is OFF and the low side FET 9 is ON, charge to the current resonance capacitor 14 is continued, and when discharge of energy stored in the leakage inductance 13 ends, the direction of the resonance current changes, so that a current flows from the current resonance capacitor to the leakage inductance 13 to the low side FET 9. At this time, the voltage of the current resonance capacitor 14 drops.

Next, in a dead time period D (period when both the FETs 8 and 9 are OFF like the period B), a current flows from the current resonance capacitor 14 to the leakage inductance 13 to the body diode D1. The ZVS is achieved by turning ON the high side FET 8 when a current is flowing through the body diode D1.

As described above, at the time of a stable (steady) operation, the leakage inductance 13 and the current resonance capacitor 14 carry out the resonance operation to control the switching frequencies of the FETs 8 and 9 variably. As a result, a voltage supplied to the primary winding of the transformer 11 is changed to control energy transmitted to the secondary winding variably.

Next, an operation under a low input voltage and a large load current after the voltage is changed will be described below. In a conventional current resonance type switching power supply device, the driving frequency of the resonance circuit is much lower than the resonance frequency of the resonance circuit, when a voltage (Vdc) input into the resonance circuit is low and the resistance of the load resistor 17 is small (the load current is large).

At this time, a through current that flows via the body diodes D1 and D2 of the high side FET 8 and the low side FET 9 is generated, thereby damaging the high side FET 8 and the low side FET 9. There is a possibility that the FETs may be destroyed depending on the magnitude of the through current.

Next, the operation waveform when this through current is generated will be described with reference to FIG. 7B. At a point E in FIG. 7B, it is assumed that the high side FET 8 is ON and the low side FET 9 is OFF. At this time, a current flows from the high side FET 8 to the leakage inductance 13 to the current resonance capacitor 14, and consequently, the voltage of the current resonance capacitor 14 rises gradually.

Next, the control circuit 7 turns OFF the high side FET 8 and keeps OFF the low side FET 9 at a point F according to information from the secondary winding fed back by the photo-coupler 21. Because the control circuit 7 drives the FETs 8 and 9 at a frequency lower than the resonance frequency of the resonance circuit, the discharge of the energy stored in the leakage inductance 13 ends in the period F to G, and then, the direction of the resonance current changes.

At this time, a current flows from the current resonance capacitor 14 to the leakage inductance 13 to the body diode D1 of the high side FET 8. After this dead time period (F to G), the low side FET 9 is turned ON at a point G. A current continues to flow from the current resonance capacitor 14 to the leakage inductance 13 to the body diode D1 of the high side FET 8.

Thus, when the low side FET 9 is turned ON at a point G, the through current flows, short-circuiting the power supply Vdc and the ground in a path of the body diode D1 (reverse recovery) to the low side FET 9 in a period until carriers in the body diode D1 are extinguished.

The amount of change (inclination) of this through current per unit time is large. That is, an excessive current flows instantaneously. Consequently, parasitic transistors in the FETs 8 and 9 are turned ON so that an excessive load is applied onto the FETs 8 and 9, and sometimes, the FETs might be destroyed.

Japanese Patent Application Laid-Open No. 2005-198457 discusses a method for solving this problem about the flow of the through current. A current resonance type switching power supply device according to Japanese Patent Application Laid-Open No. 2005-198457 detects a current flowing in the body diode of the switching element (FET), and controls the switching element not to turn ON or OFF in a period when a current flows in the body diode.

As another solution method, according to Japanese Patent Application Laid-Open No. 2007-006614, the switching operation is controlled by detecting a voltage applied between the drain and the source of the FET acting as a switching element to detect the direction of the resonance current, thereby holding the OFF period of the FET.

However, in the switching power supply device according to Japanese Patent Application Laid-Open No. 2005-198457, the switching state of the FET is held in a period when a current is flowing through the body diode. Thus, when the FETs are overloaded, until the flow of a current to the diode is stopped, the high side FET and the low side FET continue to be OFF to reduce the output voltage. In this state, no sufficient output can be obtained when the load condition changes.

In the switching power supply device discussed in Japanese Patent Application Laid-Open No. 2007-006614, after the FET is turned OFF, there occurs a period when the voltage applied between the drain and the source of the FET remains unstable due to ringing after that switching of the FET. As a result, the accuracy of a detected voltage is not high in the period when the voltage is unstable and consequently, the direction of the resonance current sometimes might not be captured accurately.

SUMMARY OF THE INVENTION

The present invention is directed to a current resonance type switching power supply device configured to, even when a load changes, detect a resonance current accurately to prevent a flow of a through current and secure a stable output voltage.

According to an aspect of the present invention, a switching power supply device includes: a transformer; a switching unit in which a first switching unit and a second switching unit are connected in series; a primary winding of the transformer connected between the first switching unit and the second switching unit each configured to serve as the switching unit; a capacitance element connected between the primary winding and the second switching unit; and a control unit configured to drive the first switching unit and the second switching unit alternately, wherein the control unit detects an amount of change in voltage of the capacitance element, and in response to a detection result, controls driving of the first switching unit and the second switching unit.

According to another aspect of the present invention, an image forming apparatus with an image forming unit configured to form an image on an image bearing member includes: a control unit configured to control image forming operation by the image forming unit; a driving unit configured to drive the image forming unit; and a switching power supply configured to supply electric power to the control unit or the driving unit, wherein the switching power supply includes: a transformer, a switching unit in which a first switching unit and a second switching unit are connected in series; a primary winding of the transformer connected between the first switching unit and the second switching unit; a capacitance element connected between the primary winding and the second switching unit; and a control unit configured to drive the first switching unit and the second switching unit alternately, and wherein the control unit detects an amount of change in voltage of the capacitance element, and, in response to a detection result, controls driving of the first switching unit and the second switching unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A and 7B are diagrams illustrating the operation waveform of the conventional circuit.

DESCRIPTION OF THE EMBODIMENTS

Various exemplary embodiments, features, and aspects of the invention will be described in detail below with reference to the drawings.

Exemplary embodiments described below are just examples of the present invention but never limit the technical scope of the present invention to only those exemplary embodiments.

To solve the above-described problems, specific configurations of the present invention will be described using following exemplary embodiments below.

Figure 1A:
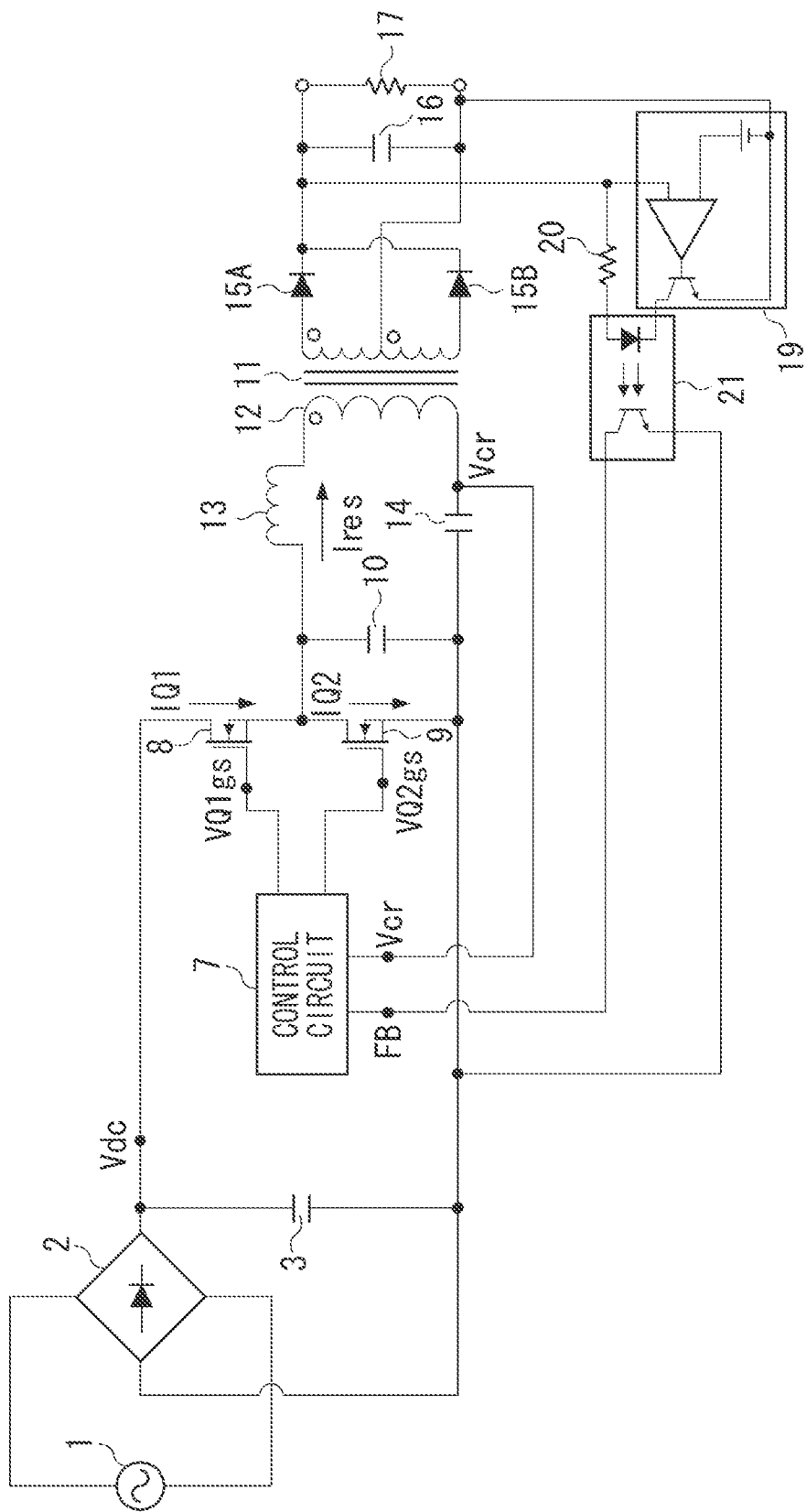
FIGS. 1A and 1B are circuit diagrams of a power supply circuits according to a first exemplary embodiment of the present invention.

A current resonance type power supply device according to a first exemplary embodiment will be described below. FIG. 1A illustrates a half-bridge type current resonance type power supply device. Referring to FIG. 1A, a current from a commercial AC power supply 1 is rectified by a full-wave rectifying circuit 2, and output to a smoothing capacitor 3.

The smoothing capacitor 3 smoothens a full-wave rectification voltage to obtain a DC output voltage Vdc. A control circuit 7 controls a driving frequency for driving a MOSFET 8 serving as a first switching unit and a MOSFET 9 serving as a second switching unit according to a signal input by a photo-coupler 21.

In the current resonance type switching power supply device, these two switching elements are connected in series to control the direction of a resonance current flowing in a primary winding of a transformer. Hereinafter, the high side MOSFET 8 and the low side MOSFET 9 are called high side FET 8 and low side FET 9 or FET 8 and FET 9, respectively.

These FET 8 and FET 9 are controlled to turn ON/OFF alternately. A voltage resonance capacitor 10 is connected to a drain terminal and a source terminal of the low side FET 9. An insulation transformer 11 is expressed by an equivalent circuit constituted of a primary winding (excitation inductance) 12 and a leakage inductance 13.

A current resonance capacitor 14 is connected as a capacitance element in series to the leakage inductance 13 to configure a series resonance circuit, which resonates at a predetermined resonance frequency.

Diodes 15A and 15B rectify a voltage generated in a secondary winding of the transformer, and a capacitor 16 smoothens the voltage rectified by the diodes 15A and 15B. The secondary winding also includes a load resistor 17 (which indicates an output target load).

A shunt regulator 19 compares the DC output voltage Vdc from the secondary winding with a reference voltage set therein, and outputs a current corresponding to an error between the reference voltage and the DC output voltage Vdc. A photo-coupler 21 transmits a signal corresponding to the error output by the shunt regulator 19 to the control circuit 7 on the primary winding side as feedback information.

Figure 1B:
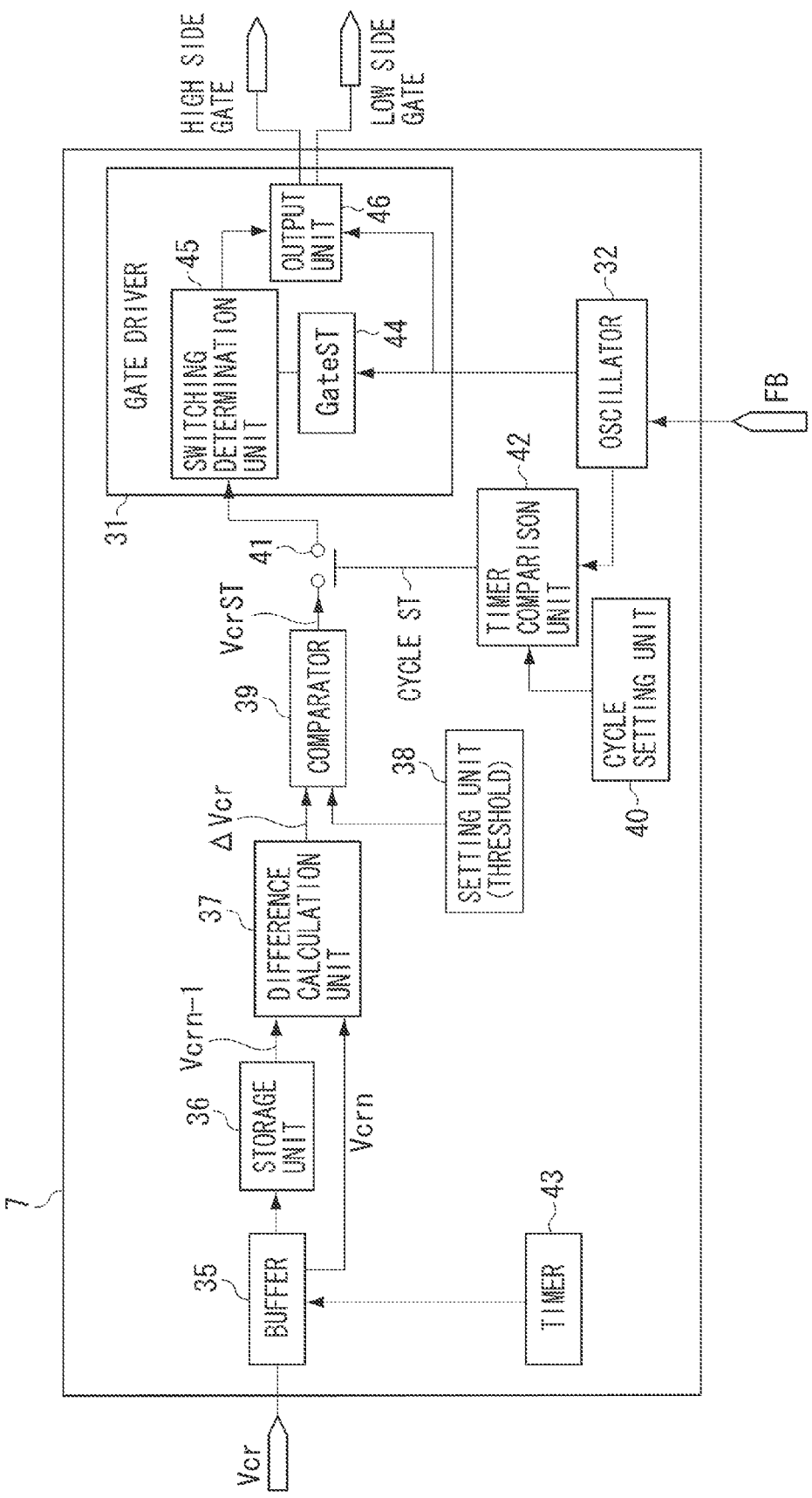

FIG. 1B is a block diagram illustrating the control circuit 7. Referring to FIG. 1B, a buffer 35 fetches in the voltage Vcr of the current resonance capacitor 14 according to the output of the timer 43, and stores it. The value to be set in the timer 43 is desired to be a sufficiently short value determined based on the current resonance capacitor 14 and the leakage inductance 13 of the transformer 11.

A storage unit 36 stores a voltage value of the buffer 35 so that the voltage Vcr of the current resonance capacitor 14 fetched one time before is held. A difference calculation unit 37 calculates a difference of values between the buffer 35 and the storage unit 36. A comparator 39 compares an output value ΔVcr of the difference calculation unit 37 with a threshold of a setting unit 38.

An output signal VcrST from the comparator 39 detects that the amount of change in the voltage Vcr of the current resonance capacitor 14 is reduced (lower than a set threshold), and then, the signal logic is changed. According to the configuration of the first exemplary embodiment, the threshold of the setting unit 38 is set to detect that the change of Vcr is reduced.

An oscillator 32 changes its oscillation frequency according to feedback information of the photo-coupler 21. A timer comparison unit 42 compares the oscillation cycle of the oscillator 32 with a set value (predetermined threshold) of a cycle setting unit 40.

The timer comparison unit 42 outputs a high-level signal (hereinafter referred to as H-level signal) when the oscillation cycle is increased (over its set value). When the H-level signal is output, a switch 41 is turned ON, so that the VcrST is connected to a gate driver 31.

In the gate driver 31, its output unit 46 drives the gates of the high side FET 8 and the low side FET 9 based on an output of the oscillator 32. A GateST signal 44, which indicates a driving state of the gates of the two FETs, turns to a low level in synchronization with a fall of the VQ1gs signal of the high side FET 8 and turns to a high level in synchronization with a fall of the VQ2gs signal of the low side FET 9.

A switching determination unit 45 monitors the statuses of the VcrST signal and the GateST signal, and when the cycle ST is on a high level and the VcrST signal is switched earlier than the GatesST signal, forcibly switches the output of the output unit 46.

Figure 2:
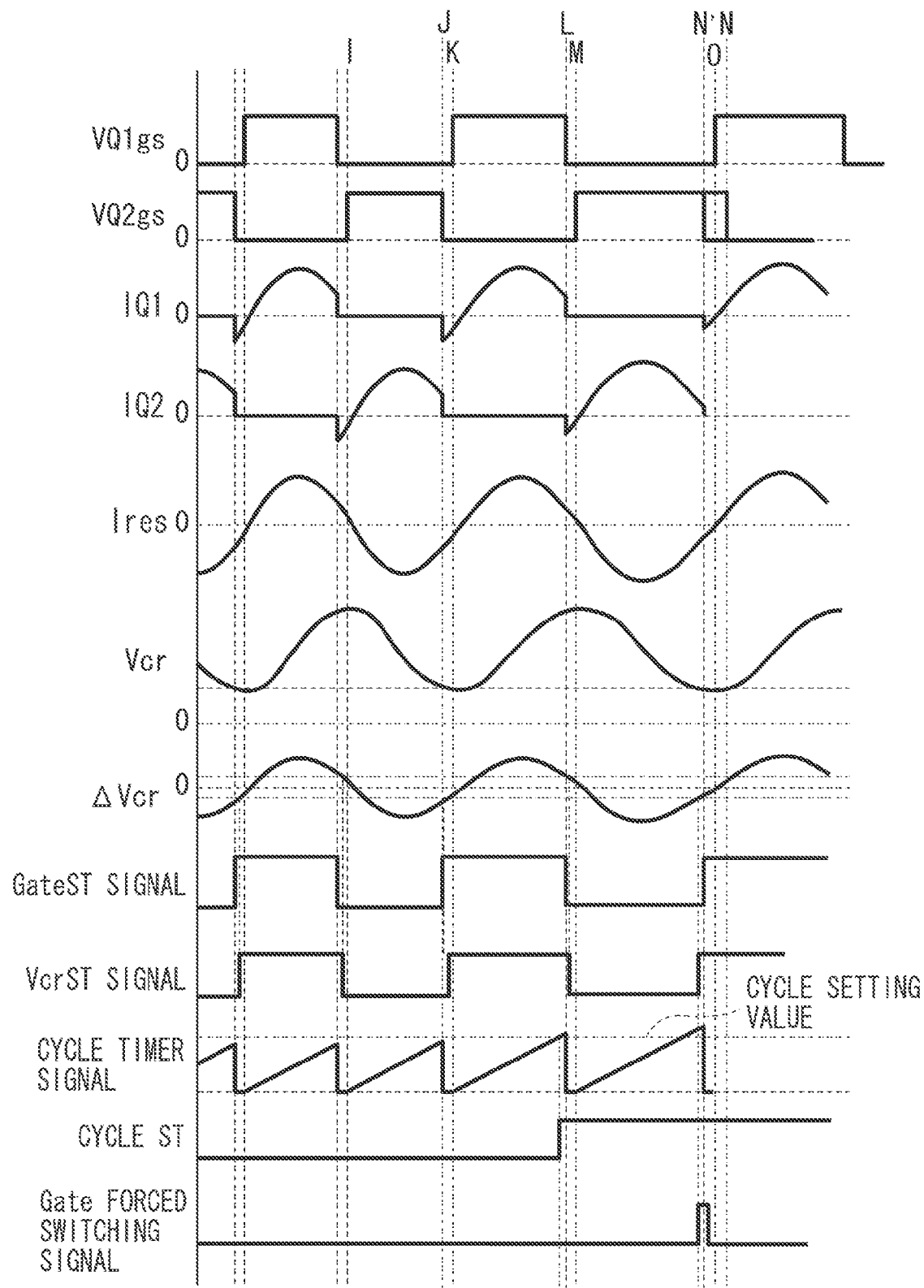
FIG. 2 illustrates an operation waveform of the power supply circuit according to the first exemplary embodiment of the present invention.

Next, an operation of the power supply circuit in FIG. 1A will be described with reference to a timing chart of FIG. 2. The timing chart of FIG. 2 illustrates statuses of signals until the load current rises from the steady condition.

After time J, the load current increases, then the load current reaches the maximum in a period between times M and N, and at the time N, the characteristic operation of the first exemplary embodiment is carried out. Symbols VQ1gs and VQ2gs denote gate driving voltages of the high side FET 8 and the low side FET 9, respectively. Symbols IQ1 and IQ2 denote drain currents of the high side FET 8 and the low side FET 9, respectively. Symbol Ires denotes a resonance current flowing through the resonance circuit and symbol Vcr denotes a voltage of the current resonance capacitor 14.

Symbol ΔVcr denotes an amount of change in voltage per unit time of the current resonance capacitor 14. Symbol VcrST denotes a signal which is reversed according to a result of comparison between the ΔVcr and the aforementioned threshold. When the VcrST is switched to an H level, it indicates that the amount of decrease of the ΔVcr has been reduced.

When the VcrST is switched to a low level (hereinafter referred to as an L level), it indicates that the amount of increase of the ΔVcr has been reduced. The control circuit 7 predicts a switching in the direction of the resonance current by detecting that a voltage change amount ΔVcr per unit time of the current resonance capacitor 14 has been reduced.

GateST is a signal which is switched in synchronization with a fall of the gate driving voltage of the high side FET 8 and the low side FET 9. A cycle timer value (counted by the aforementioned timer 43) is obtained by measuring a period when the FET 8 or the FET 9 remains ON.

When the cycle timer value meets the cycle setting value, a timer comparison unit 42 serving as a determination unit switches its output (cycle ST) to an H level. A count value of the timer 43 is reset when the FET 9 or the FET 8 is turned off.

The control circuit 7 switches a gate forced switching signal according to the statuses of the GateST and the VcrST. When the cycle ST turns to an H level, the control circuit 7 determines that the frequency is lower than a predetermined frequency. In this state, when the logic of the VcrST is switched before the logic of the GateST is switched, the control circuit 7 turns the gate forced switching signal to an H level.

A circuit operation with a passage of time will be described below. At time I, the control circuit 7 turns OFF the high side FET 8 and turns ON the low side FET 9. According to feedback information of the photo-coupler 21, the control circuit 7 holds the statuses of the switches (FET 8 OFF and FET 9 ON) in a period from time I to time J.

In a period from time I to time J, the resonance current flowing through the resonance circuit transitions between two statuses. First, a current flows from the transformer 11 to the current resonance capacitor 14 to the low side FET 9, so that a voltage of the current resonance capacitor 14 rises. Subsequently, when energy stored in the transformer 11 is released, the direction of the resonance current is reversed.

The resonance current flows from the current resonance capacitor 14 to the transformer 11 to the low side FET 9, so that the voltage Vcr of the current resonance capacitor 14 drops gradually. While the statuses of the switches (FET 8 ON and FET 9 OFF) are held, the timer 43 (cycle timer value) continues to count up.

At time J when the ON time of the low side FET 9 determined by the control circuit 7 elapses, the control circuit 7 turns OFF the low side FET 9 to form a dead time up to time K. Additionally, the count of the cycle timer is reset. In a period from time J to time K, the resonance current flows from the current resonance capacitor 14 to the transformer 11 to the body diode of the high side FET 8, so that the voltage Vcr of the current resonance capacitor 14 continues to decrease.

In this interval, when the voltage Vcr of the current resonance capacitor 14 drops, the resonance current decreases gradually to approach zero. With a decrease of the resonance current, the transfer amount of charge of the current resonance capacitor 14 deceases and consequently, a change in voltage ΔVcr per unit time of the current resonance capacitor 14 decreases.

When the value of the ΔVcr exceeds a set threshold VcrH, the control circuit 7 switches the VcrST to an H level. After that, the control circuit 7 turns ON the high side FET 8 at time K. At this time, a current is flowing through the body diode D1 of the high side FET 8. When the FET 8 is turned ON under this condition, the ZVS can be achieved.

According to feedback information from the photo-coupler 21, the control circuit 7 holds the aforementioned switching status (FET 8 ON and FET 9 OFF) in a predetermined period of time. The load current increases compared to the period from time I to time J to reduce the driving frequency, and consequently, a holding time of the switching condition is longer in the period from time K to time L than the period from time I to time J.

In a period from time K to time L, current transitions between two statuses. First, the resonance current flows from the current resonance capacitor 14 to the transformer 11 to the high side FET 8, so that the voltage Vcr of the current resonance capacitor 14 continues to decrease. When energy stored in the current resonance capacitor 14 is released, the direction of the resonance current is reversed, so that the resonance current flows from the high side FET 9 to the transformer 11 to the current resonance capacitor 14.

A current flows into the current resonance capacitor 14, so that the voltage Vcr of the capacitor rises gradually. While the statuses of the switches (FET 8 ON and FET 9 OFF) are held, the timer 43 (cycle timer value) continues to count up.

At time L when the ON time of the high side FET 8 determined by the control circuit 7 elapses, the control circuit 7 turns OFF the high side FET 8 to form a dead time up to time M. The count value of the timer 43 (cycle timer value) meets its set value before it is reset at time L, the cycle ST turns to an H level, indicating that the cycle ST has been increased over a predetermined cycle.

In a period from time L to time M, a current flows from the transformer 11 to the current resonance capacitor 14 to the body diode of the low side FET 9, so that the voltage Vcr of the current resonance capacitor 14 rises. As the voltage Vcr of the current resonance capacitor 14 rises, the resonance current Ires decreases gradually to approach zero.

As the resonance current Ires decreases, the transfer amount of charge in the current resonance capacitor 14 deceases, so that the change in a voltage Δcr per unit time of the current resonance capacitor 14 is reduced. When the ΔVcr is lower than a set threshold, the control circuit 7 switches the VcrST to an L level.

At time M, the control circuit 7 turns ON the low side FET 9. At this time, a current is flowing through the body diode D1 of the low side FET 9. When the FET is turned ON under this condition, the ZVS is achieved.

According to feedback information from the photo-coupler 21, the control circuit 7 holds the aforementioned switching status (FET 8 ON and FET 9 OFF). The load current increases compared to the period from time K to time L to reduce the driving frequency, and consequently, a holding time of the switching condition becomes longer in the period from time M to time N than the period from time K to time L.

In a period from time M to time N, the resonance current transitions between two statuses. First, the resonance current flows from the transformer 11 to the current resonance capacitor 14 to the low side FET 9, so that the voltage Vcr of the current resonance capacitor 14 continues to rise. When energy stored in the transformer 11 is released, the direction of the current is reversed.

The resonance current flows from the current resonance capacitor 14 to the transformer 11 to the low side FET 9, so that the voltage Vcr of the current resonance capacitor 14 drops gradually. While the statuses of the switches (FET 8 ON and FET 9 OFF) are held, the timer 43 (cycle timer value) continues to count up.

At time N' when the ON time of the low side FET 9 determined by feedback information from the photo-coupler 21 elapses, the control circuit 7 attempts to turn OFF the low side FET 9. On the other hand, because the cycle timer value agrees with its cycle set value until time N is reached, the cycle ST holds an H level. After that, with a decrease in the resonance current, the value ΔVcr decreases, and the ΔVcrST signal is switched to an H level.

The control circuit 7 monitors the GateST signal and the VcrST signal, and detects that the cycle ST is on an H level and that the VcrST signal is switched earlier than the GateST signal is switched. Then, the control circuit 7 forcibly switches the gate driving signal prior to time N.

At time N', the control circuit 7 forcibly turns OFF the low side FET 9. After a predetermined dead time elapses, the high side FET is turned ON at time O. At time O, the resonance current flows from the current resonance capacitor 14 to the transformer 11 to the body diode D1 of the high side FET 8. When the high side FET 8 is turned ON at this timing, the ZVS can be achieved.

According to the first exemplary embodiment, as described above, a change in voltage of the current resonance capacitor is monitored to control the operations of the high side FET and the low side FET. Consequently, it is possible to suppress a through current which may flow through the FET and the diode when the load current is increased. As a result, a stress which may be applied to the FET can be avoided to prevent the FETs from being destroyed and further, reliability of the switching operation can be improved.

According to a second exemplary embodiment, the circuit on the primary side including the control circuit of the first exemplary embodiment is configured of an analog circuit. As for portions overlapping the first exemplary embodiment, description thereof is omitted because they are operated in the same manner.

Figure 3:
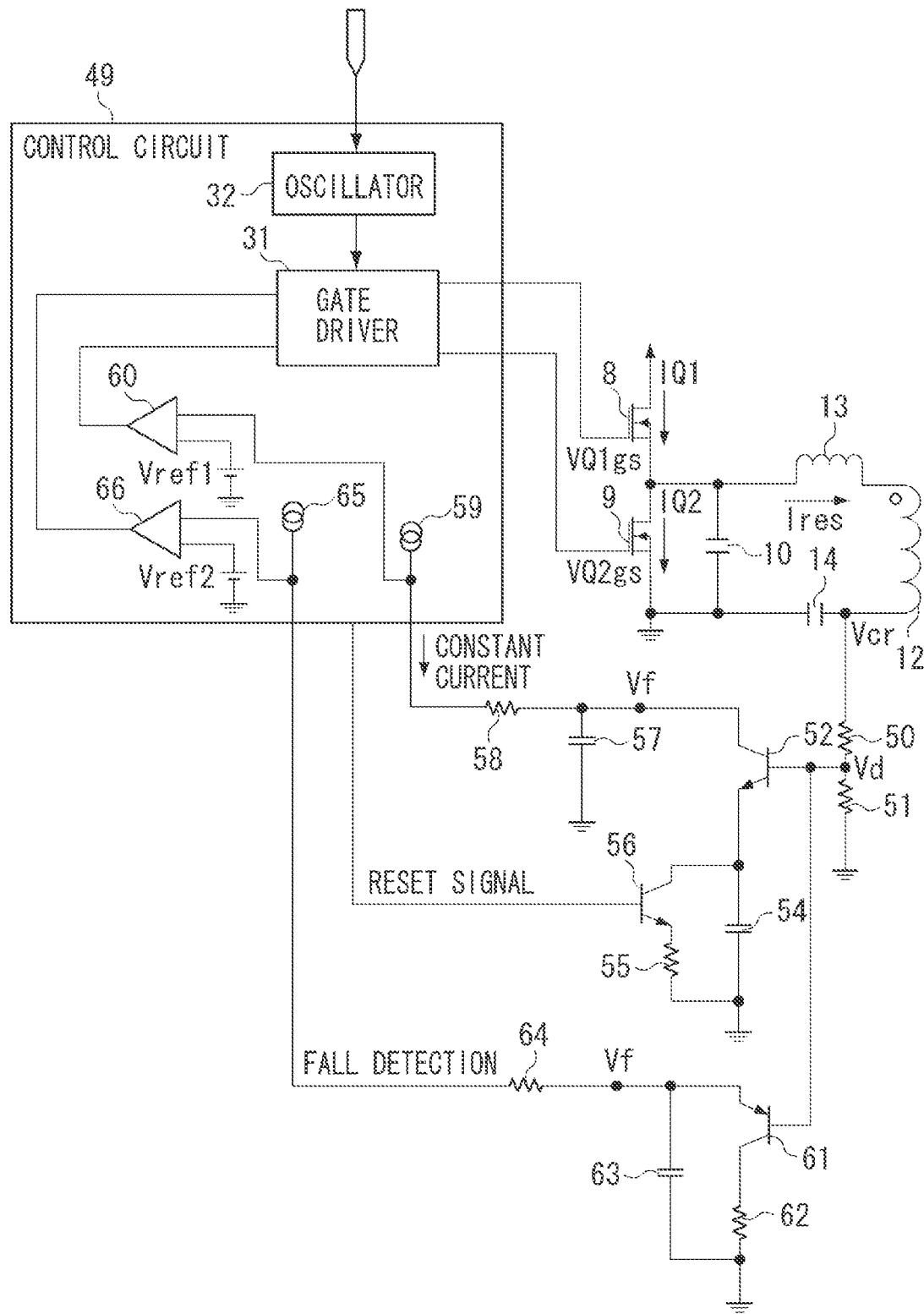
FIG. 3 is a circuit diagram of a power supply circuit according to a second exemplary embodiment of the present invention.

FIG. 3 illustrates the circuit configuration of the second exemplary embodiment, which is a half-bridge type converter. Particularly, FIG. 3 illustrates a detailed configuration of a current resonance circuit section on the primary side of the transformer, which is a characteristic portion of the present invention. The circuit configuration of the second exemplary embodiment except the resonance circuit unit is similar to that of the first exemplary embodiment in the input unit and the output unit on the secondary side of the transformer illustrated in FIG. 1.

As illustrated in FIG. 3 includes a control circuit 49. Resistors 50 and 51 divide the voltage Vcr of the current resonance capacitor 14. It is assumed that a voltage applied to a connection point between the resistors 50 and 51 is a monitor voltage Vd. The sensitivity of the circuit may be changed according to a ratio in resistance between the resistors 50 and 51.

Devices 52 to 60 form a circuit for detecting a rise of the voltage Vcr of the current resonance capacitor 14. This circuit includes an NPN transistor 52, resistors 55 and 58, capacitors 54 and 57. The capacitor 54 is charged during a rise of the voltage Vcr of the current resonance capacitor 14.

The circuit further includes an NPN transistor 56, a constant current source 59, and a comparator 60. When the NPN transistor 56 conducts electricity, charge on the capacitor 54 is discharged. The constant current source 59 charges the capacitor 57 up to a predetermined voltage VrH. The comparator 60 compares a voltage Vr of the capacitor 57 with a predetermined value Vref1 and outputs its comparison result to a gate driver 31.

Devices 61 to 66 form a circuit for detecting a fall of the voltage Vcr of the current resonance capacitor 14. A PNP transistor 61 conducts electricity when the voltage Vcr of the current resonance capacitor 14 drops to discharge charge on the capacitor 63. This circuit further includes resistors 62 and 64, a constant current source 65, and a comparator 66. The constant current source 65 charges the capacitor 63 up to a predetermined voltage VfH, and the comparator 66 compares a voltage Vf of the capacitor 63 with a predetermined value Vref2, and outputs a comparison result to the gate driver 31.

Figure 4:
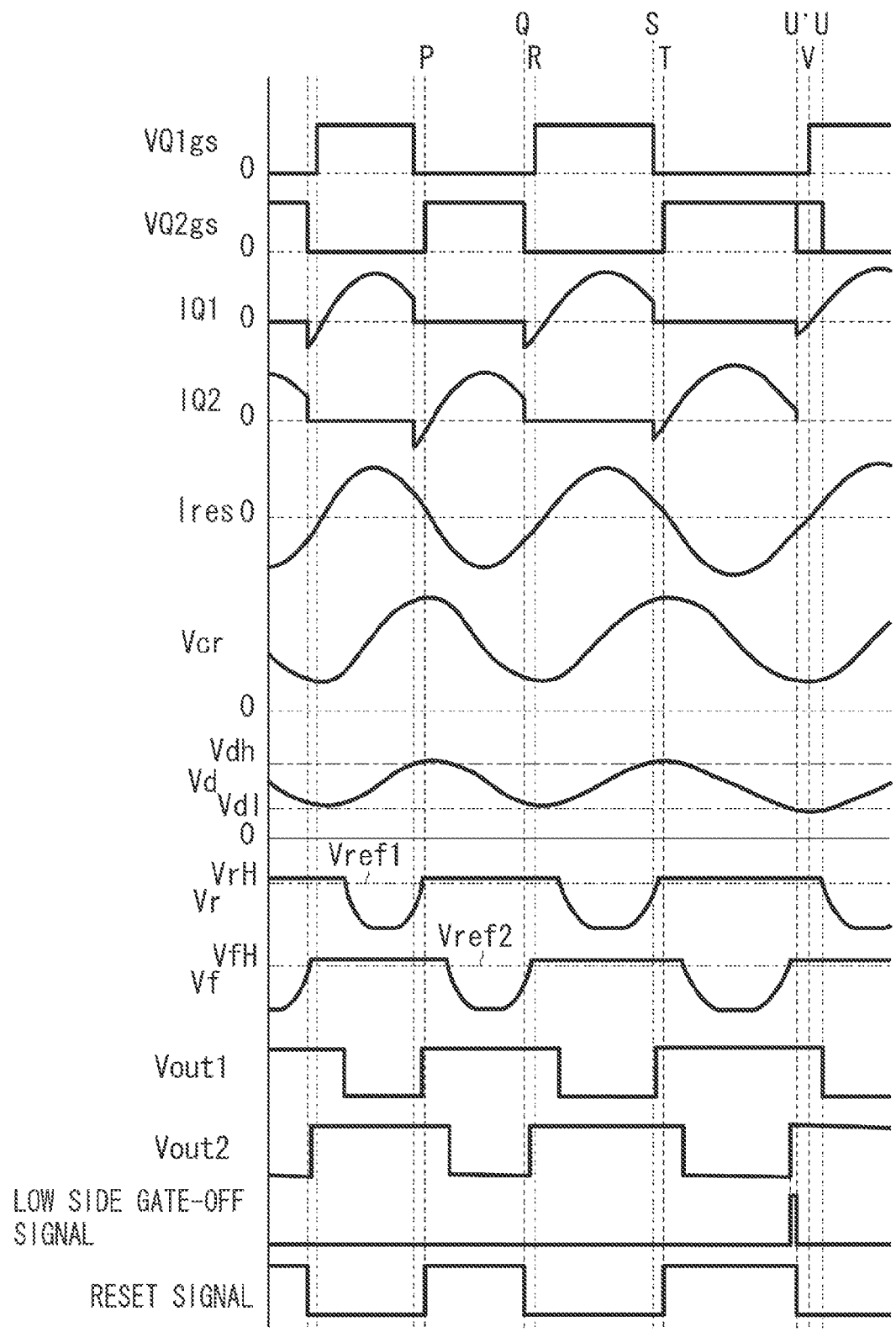
FIG. 4 illustrates an operation waveform of a power supply circuit according to the second exemplary embodiment of the present invention.

Next, a circuit operation according to the second exemplary embodiment will be described in time-series manner based on a timing chart illustrated in FIG. 4. Referring to FIG. 4, the load current increases after time Q and the load current reaches the maximum in a period between times T and U and at time U, the characteristic operation of the second exemplary embodiment is carried out.

Symbols VQ1gs and VQ2gs denote gate driving voltages of the high side FET 8 and the low side FET 9, respectively. Symbols IQ1 and IQ2 denote drain currents of the high side FET 8 and the low side FET 9, respectively. Symbol Ires denotes a resonance current flowing through the resonance circuit and Vcr denotes a voltage of the current resonance capacitor 14.

Symbol Vd denotes a voltage at a connection point between the resistors 50 and 51, and indicates a displacement proportional to a change in the Vcr. The control circuit 49 switches a reset signal to a high level, and discharges the capacitor 54. The transistor 52 conducts electricity when the Vd exceeds Ve (emitter voltage)+Vb (voltage between a base and an emitter) of the transistor 52.

While the Vd is rising to hold the Vbe, the transistor 52 can continue to conduct electricity. At this time, charge is moved to the capacitor 54 from the capacitor 57, so that the voltage Vr of the capacitor 57 falls. When the monitor voltage Vd becomes smaller than the Ve+Vbe of the transistor 52, the transistor 52 transitions gradually to a non-conductive state.

On the other hand, when the monitor voltage Vd becomes lower than VfH−Vbe, the transistor 61 conducts electricity, and when the Vd exceeds Vf−Vbe, the transistor 61 turns gradually to the non-conductive state. Symbol Vr denotes a voltage value of the capacitor 57 and symbol Vf denotes a voltage value of the capacitor 63. Symbol Vout1 denotes an output of the comparator 60 and symbol Vout2 denotes an output of the comparator 66.

A reset signal drives the transistor 56 and its logic is switched in synchronization with a gate voltage waveform of the low side FET 9. While the low side FET 9 is ON, the reset signal turns to a high level, so that charge on the capacitor 54 is discharged.

In FIG. 4, at a point P, the control circuit 49 keeps OFF the high side FET 8 and turns ON the low side FET 9. According to feedback information from the photo-coupler 21, the control circuit 7 holds the aforementioned switching status (high side FET 8 OFF and low side FET 9 ON) in a period from time P to time Q.

Next, in a period from time P to time Q, current flowing through the resonance circuit transitions between two statuses. First, the resonance current Ires flows from the transformer 11 to the current resonance capacitor 14 to the low side FET 9, so that the voltage of the current resonance capacitor 14 rises.

When energy stored in the transformer 11 is released, the direction of the resonance current is reversed. The resonance current Ires flows from the current resonance capacitor 14 to the transformer 11 to the low side FET 9, so that the voltage Vcr of the current resonance capacitor falls gradually. At the same time, the monitor voltage Vd is also changed.

When the monitor voltage Vd drops to be lower than the VfH−Vb, the transistor 61 discharges charge of the capacitor 63. After that, the monitor voltage Vd continues to decrease and consequently, the transistor 61 continues to conduct electricity. As a result, the Vf is decreased.

When the change in the Vd is decreased, the transistor 61 cannot hold the Vbe of the transistor 61, so that the transistor 61 cannot conduct electricity sufficiently. The potential of the Vf rises gradually due to a charging current based on a current from the constant current source 65.

After that, when the transistor 61 is turned OFF, the monitor voltage Vd rises up to the predetermined voltage VfH. When an output Vout2 of the comparator 61 exceeds another input Vref2 of the comparator 66, the output Vout2 is reversed.

At time Q when the ON time of the low side FET 9 determined by the control circuit 49 elapses, the control circuit 49 turns OFF the low side FET 9 to form a dead time up to time R. In a period from time Q to time R, the resonance current Ires flows from the current resonance capacitor 14 to the transformer 11 to the body diode of the high side FET 8, so that the voltage Vcr of the resonance capacitor decreases.

In this interval, when the voltage Vcr of the current resonance capacitor 14 drops, the resonance current Ires decreases gradually to approach zero. After that, the control circuit 49 turns ON the high side FET 8 at time R. At this time, a current is flowing through the body diode D1 of the high side FET 8. When the FET 8 is turned ON under this condition, the ZVS can be achieved.

According to feedback information from the photo-coupler 21, the control circuit 49 holds the aforementioned switching status (high side FET 8 ON and low side FET 9 OFF) in a predetermined period of time. The load current increases compared to the period from time P to time Q to reduce the driving frequency, and consequently, a holding time of the switching condition is longer in the period from time R to time S than the period from time P to time Q.

In a period from time R to time S, the resonance current Ires transitions between two statuses. First, the resonance current Ires flows from the current resonance capacitor 14 to the transformer 11 to the high side FET 8, so that the voltage Vcr of the current resonance capacitor 14 continues to decrease. When energy stored in the current resonance capacitor 14 is released, the direction of the resonance current Ires is reversed.

The resonance current Ired flows from the high side FET 9 to the transformer 11 to the current resonance capacitor 14, so that the voltage Vcr of the current resonance capacitor 14 rises gradually. The monitor voltage Vd is changed in synchronization with the voltage Vcr of the current resonance capacitor 14. When the monitor voltage Vd becomes higher than the potential of the capacitor 54 plus Vbe, the transistor 52 conducts electricity and discharges charge of the capacitor 57.

While the monitor voltage Vd continues to rise, the transistor 52 continues to conduct electricity. As a result, the Vr is decreased. When the Vr drops below the Vref1, the output Vout1 of the compactor 60 is reversed to low level. When the displacement by a rise of the Vd is decreased, the transistor 52 cannot conduct electricity sufficiently.

The potential of the Vr rises gradually because the charging current based on a current from the constant current source 65 increases. When the transistor 52 is turned OFF, the Vr rises up to the predetermined voltage VrH. When the output Vout1 of the comparator 60 exceeds another input Vref1 of the comparator 60, the output Vout1 is reversed to a high level.

At time S when the ON time of the high side FET 8 determined by the control circuit 49 elapses, the control circuit 49 turns OFF the high side FET 8 to form a dead time up to time T.

In a period from time S to time T, the resonance current Ires flows from the transformer 11 to the current resonance capacitor 14 to the body diode of the low side FET 9, so that the voltage Vcr of the current resonance capacitor 14 rises. As the voltage Vcr of the current resonance capacitor 14 rises, the resonance current Ires decreases gradually.

At time T, the control circuit 49 turns ON the low side FET 9. At this time, a current is flowing through the body diode D1 of the low side FET 9. When the low side FET 9 is turned ON under this condition, the ZVS is achieved.

At time T, the control circuit 49 turns ON the low side FET 9 and turns OFF the high side FET 8. The control circuit 49 holds the switching condition (low side FET 9 ON and high side FET 8 OFF) according to feedback information. The load current increases compared to the period from time R to time S to reduce the driving frequency, and consequently, a holding time of the switching condition becomes longer in the period from time T to time U than the period from time R to time S.

In a period from time T to time U, the resonance current transitions between two statuses. First, the resonance current flows from the transformer 11 to the current resonance capacitor 14 to the low side FET 9, so that the voltage Vcr of the current resonance capacitor 14 continues to rise. When energy stored in the transformer 11 is released, the direction of the current is reversed.

The resonance current flows from the current resonance capacitor 14 to the transformer 11 to the low side FET 9, so that the voltage of the current resonance capacitor drops gradually. The Vd is also changed in synchronization with the voltage Vcr of the current resonance capacitor 14.

When the monitor voltage Vd drops so as to be lower than the VfH–Vb, the transistor 61 conducts electricity to discharge charge of the capacitor 63. When the Vf becomes lower than the Vref2 which is another input of the comparator 66, the output Vout2 of the comparator 66 is reversed to a low level. After that, the Vd continues to decrease and thus, the transistor continues to conduct electricity. As a result, the Vf is decreased.

When the displacement of the Vd is decreased, the transistor 61 becomes unable to conduct electricity sufficiently. The potential of the Vf rises gradually due to a current from the constant current source 65. When the transistor 61 is turned OFF, the Vf rises up to the predetermined voltage VfH. At this time, when the output Vout2 of the comparator 61 exceeds another input Vref2 of the comparator 66, the output Vout2 is reversed to a high level.

By time U' when the ON time determined by the control circuit 49 elapses, the Vout2 turns to a high level. If the ZVS can be held, after the VQ2$gs$ is turned OFF, the Vout2 turns to a high level. On the other hand, at time U, the Vout2 turns to a high level while the VQ2$gs$ is ON. This status is detected by the gate driver 31, so that the VQ2$gs$ is forcibly turned OFF.

Figure 5:
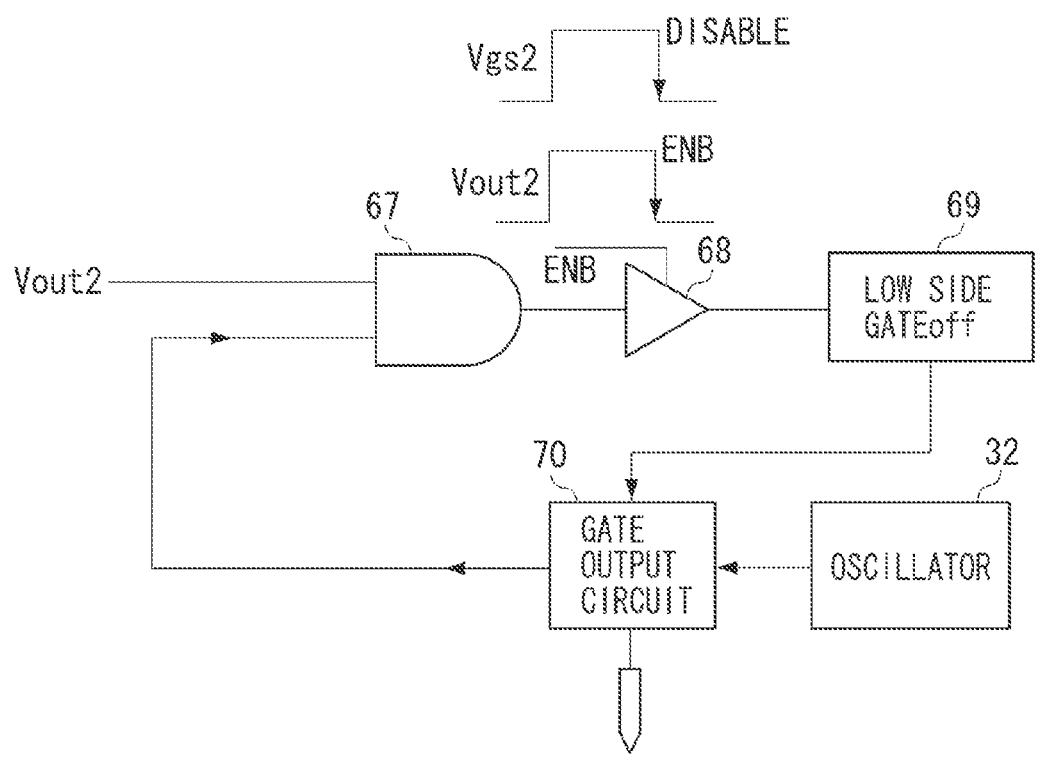
FIG. 5 is a circuit diagram of the power supply circuit according to the second exemplary embodiment of the present invention.
Figure 6A:
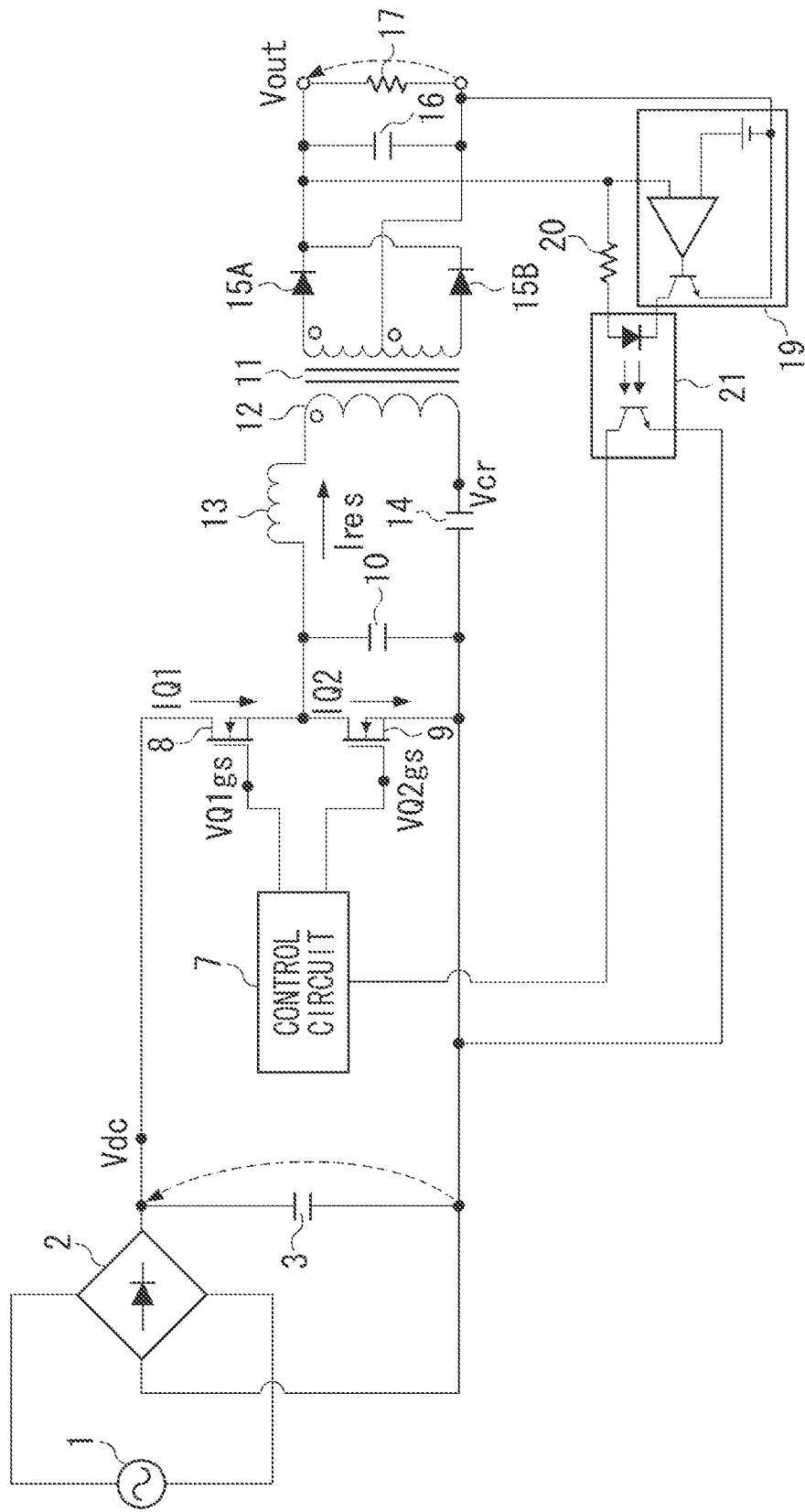
FIGS. 6A and 6B are circuit diagrams of a conventional power supply circuit.
Figure 6B:
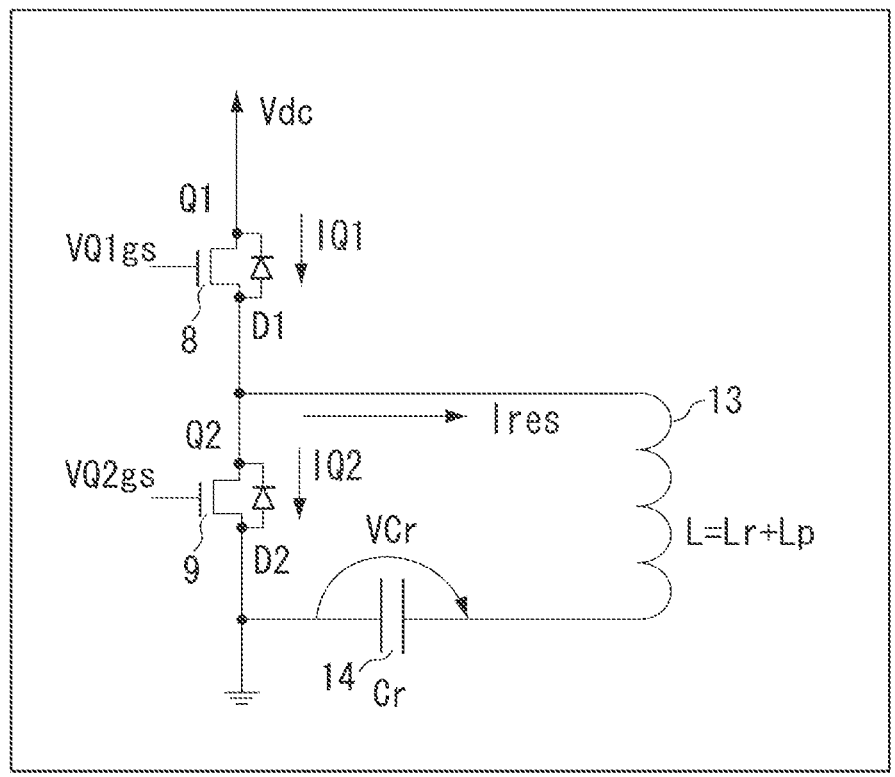
Figure 7A:
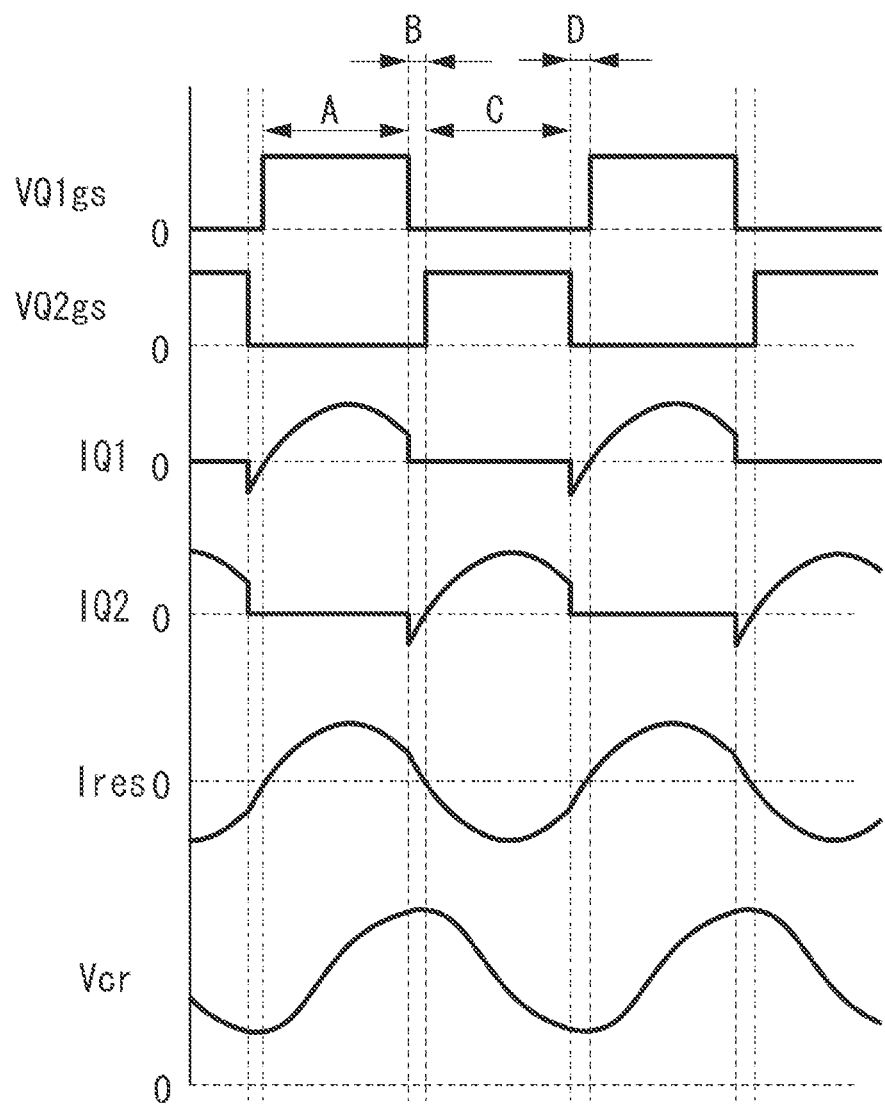

As illustrated in FIG. 5, the interior of the gate driver 31 is constituted of an AND circuit 67, a buffer 68 with an enable input, a low side gate-off circuit 69, and a gate output circuit 70. A similar circuit configuration is provided for the gate of the high side FET 8 also. The buffer 68 with an enable input is enabled upon a fall of the output of the Vout2 and disabled upon a fall of the VQ2$gs$.

When the Vout2 turns to a high level before the VQ2$gs$ is turned OFF, the output of the AND circuit 67 turns to a high level. At this time, the low side gate-off circuit 69 is operated to output a low side gate-off signal, and the gate output of the FET 9 is forced to be OFF.

At time U', the control circuit 49 turns OFF the low side FET 9 by an operation of the gate driver. After the dead time of a predetermined period elapses, the high side FET 8 is turned ON at time V. At time V, the resonance current Ires flows from the resonance capacitor 14 to the transformer 11 to the body diode of the high side FET 8. By turning ON the high side FET 8 at this timing, the ZVS can be held.

Even when a load on the resonance circuit is increased, the above-described configuration enables the FET to be turned OFF without departing from the resonance condition according to a changing direction of the voltage of the current resonance capacitor 14 and the driving conditions of the two FETs (high side FET and low side FET). As a result, the through current can be prevented from flowing through any FET.

<Application Example of the Switching Power Supply Device>

The current resonance type switching power supply device described in the first and second exemplary embodiments above can be applied to a low voltage power supply for image forming apparatuses such as a laser beam printer, a copying machine, a facsimile machine. Application examples of the current resonance type switching power supply device will be described below.

The switching power supply device is applied to a power supply device for supplying electricity to a controller of the image forming apparatus or a motor serving as a driving unit of a conveyance roller for conveying paper sheets.

Figure 8A:
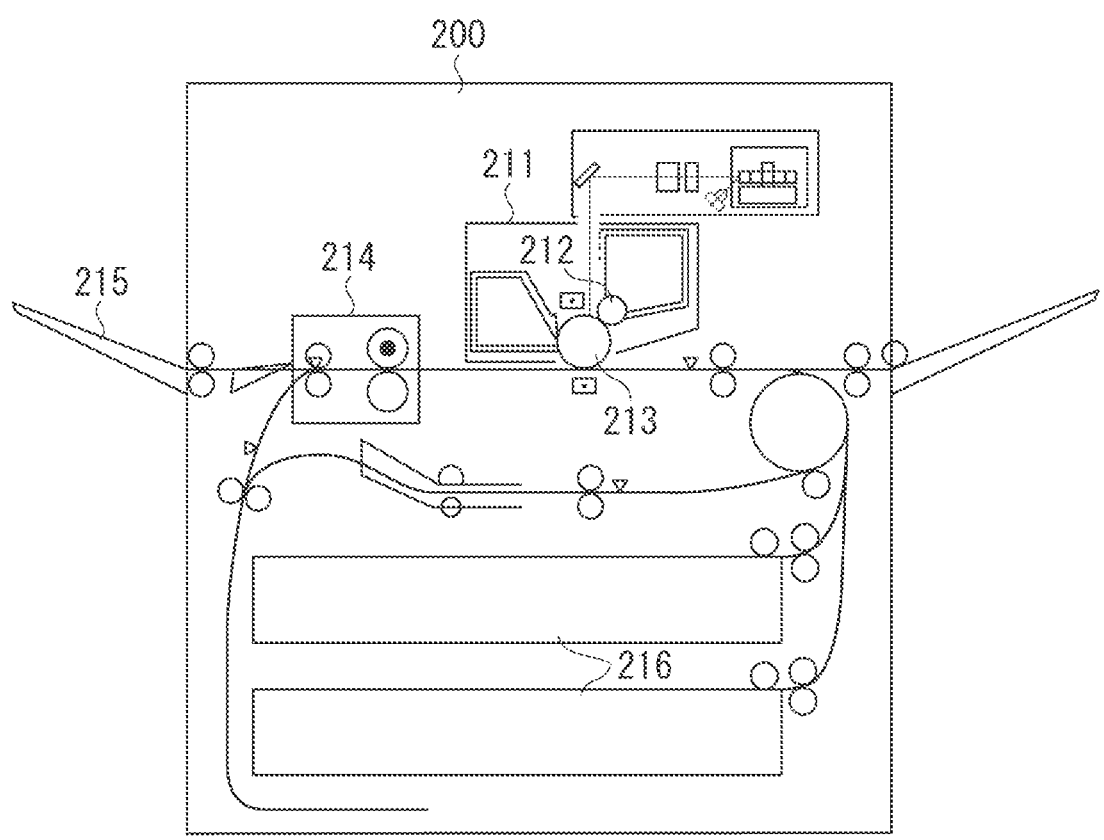
FIGS. 8A and 8B illustrate an application example of a power supply circuit according to the present invention.

FIG. 8A illustrates a schematic configuration of a laser beam printer as an example of the image forming apparatus. A laser beam printer 200 includes an image forming unit 210, which is a photosensitive drum 211 serving as an image bearing member on which a latent image is to be formed, and a development unit 212 configured to develop the latent image formed on the photosensitive drum using toner.

The toner image developed on the photosensitive drum 211 is transferred to a sheet (not illustrated) serving as a recording medium supplied from a cassette 216, the toner image transferred to the sheet is fixed by a fixing device 214, and then the paper is discharged into a tray 215.

Figure 8B:
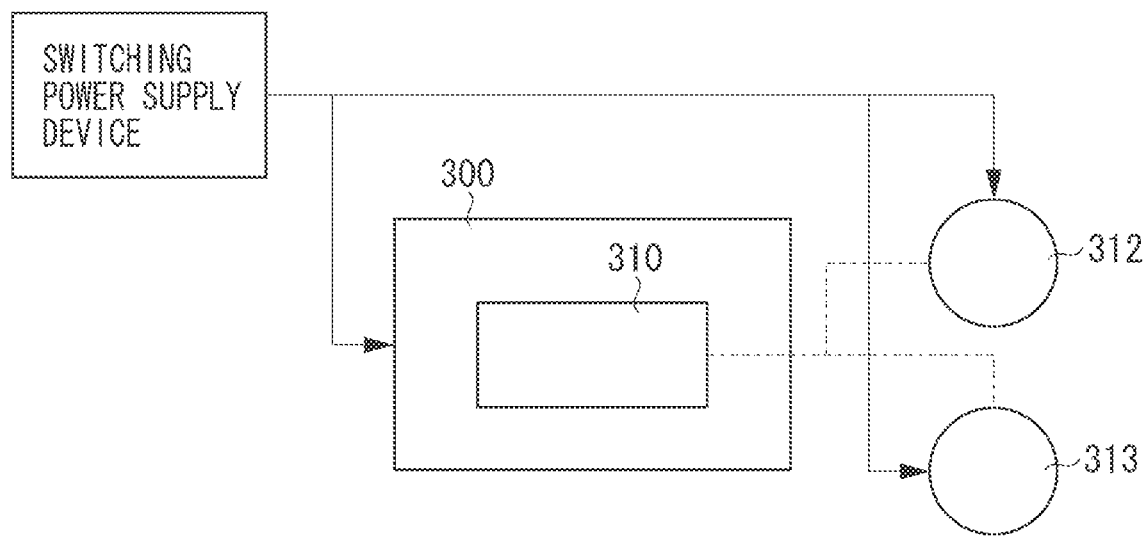

FIG. 8B illustrates a controller serving as a control unit of the image forming apparatus and its power supply line from the switching power supply device to a motor serving as a driving unit. The aforementioned current resonance power supply device can be applied to a low voltage power supply device which supplies electricity to a controller 300 containing a central processing unit (CPU) 310 for controlling the image forming apparatus and to motors 312 and 313 serving as a driving unit for forming images.

As electricity to be supplied, the controller 300 is supplied with 3.3 V and the motors are supplied with 24 V. The motor 312 drives a conveyance roller for conveying paper sheets and the motor 313 drives the fixing device 214.

In the image forming apparatus such as a laser beam printer, load on a motor for conveying paper sheets or a motor for driving the photosensitive drum and the development unit serving as the image forming units can be changed. Thus, in response to such a change in load, power needs to be supplied stably from the aforementioned switching power supply device to the motors.

By applying the aforementioned current resonance type switching power supply device, even when the load is changed, a through current can be prevented and a stable voltage can be supplied.

The current resonance type power supply device described in the first and second exemplary embodiments above can be applied to not only the image forming apparatus but a low voltage power supply device of other electronic apparatuses.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-267289 filed Nov. 30, 2010, which is hereby incorporated by reference herein in its entirety.

What is claimed is:

1. A switching power supply device comprising:
   a transformer;
   a first switching element and a second switching element connected to a primary winding of the transformer, the first switching element and the second switching element being connected in series;
   a capacitance element connected to the primary winding in series;
   a control unit configured to drive the first switching element and the second switching element alternately;
   a detection unit configured to detect a voltage of the capacitance element;
   a first generation unit configured to generate a first pulse signal according to the voltage of the capacitance element detected by the detection unit; and
   a second generation unit configured to generate a second pulse signal according to a driving state of the first switching element and the second switching element,
   wherein the control unit is configured to control the first switching element and the second switching element so as to provide a period in which the first switching element and the second switching element are turned off, when a state where a first timing for switching a level of the first pulse signal from high to low is earlier than a second timing for switching a level of the second pulse signal from high to low is changed to a state where the first timing is later than the second timing.

2. The switching power supply device according to claim 1, wherein the control unit, when an amount of change in voltage of the capacitance element is equal to or less than a threshold, turns on the first switching element, and when the amount of change in voltage of the capacitance element is larger than the threshold, turns on the second switching element.

3. The switching power supply device according to claim 1, further comprising a feedback unit configured to feed back a voltage output from a secondary winding of the transformer, wherein the control unit controls a driving frequency of the first switching element and the second switching element according to a signal from the feedback unit.

4. The switching power supply device according to claim 2, wherein the control unit, when a driving frequency of the first switching element and the second switching element is lower than a resonance frequency determined by a leakage inductance of the transformer and the capacitance element, controls the driving of the first switching element and the second switching element according to the detected amount of change in voltage of the capacitance element.

5. The switching power supply device according to claim 2, further comprising a voltage detection unit configured to detect a rise in voltage of the capacitance element and a fall in voltage of the capacitance element.

6. The switching power supply device according to claim 1, wherein the control unit generates a signal for turning off the second switching element forcibly before the first switching element is turned on so that the first switching element is not turned on in a state where the second switching element is turned on, based on the first pulse signal and the second pulse signal.

7. The switching power supply device according to claim 1, wherein, the state where the first timing is later than the second timing occurs when a current flowing from a secondary winding of the transformer to a load increases.

8. An image forming apparatus with an image forming unit configured to form an image on an image bearing member, comprising:
- a control unit configured to control an image forming operation by the image forming unit;
- a driving unit configured to drive the image forming unit; and
- a switching power supply device configured to supply electric power to the control unit or the driving unit,
- wherein the switching power supply device includes:
- a transformer;
- a first switching element and a second switching element connected to a primary winding of the transformer, the first switching element and the second switching element being connected in series;
- a capacitance element connected to the primary winding in series;
- a switching control unit of the supply device configured to drive the first switching element and the second switching element alternately;
- a detection unit configured to detect a signal according to a voltage of the capacitance element;
- a first generation unit configured to generate a first pulse signal according to the voltage of the capacitance element detected by the detection unit; and
- a second generation unit configured to generate a second pulse signal according to a driving state of the first switching element and the second switching element,
- wherein the switching control unit of the supply device is configured to control the first switching element and the second switching element so as to provide a period in which the first switching element and the second switching element are turned off, when a state where a first timing for switching a level of the first pulse signal from high to low is earlier than a second timing for switching a level of the second pulse signal from high to low is changed to a state where the first timing is later than the second timing.

9. The image forming apparatus according to claim 8, wherein the switching control unit of the supply device, when an amount of change in voltage of the capacitance element is equal to or less than a threshold, turns on the first switching element, and when the amount of change in voltage of the capacitance element is larger than the threshold, turns on the second switching element.

10. The image forming apparatus according to claim 8, further comprising a feedback unit configured to feed back a voltage output from a secondary winding of the transformer, wherein the switching control unit of the supply device controls the driving frequency of the first switching element and the second switching element.

11. The image forming apparatus according to claim 9, wherein the control unit of the supply device, when a driving frequency of the first switching element and the second switching element is lower than a resonance frequency determined by a leakage inductance of the transformer and the capacitance element, controls the driving of the first switching element and the second switching element according to the detected amount of change in voltage of the capacitance.

12. The image forming apparatus according to claim 9, wherein the switching control unit of the supply device includes a voltage detection unit configured to detect a rise in voltage of the capacitance element and a fall in voltage of the capacitance element.

13. The image forming apparatus according to claim 8, wherein the control unit of the supply device generates a signal for turning off the second switching element forcibly before the first switching element is turned on so that the first switching element is not turned on in a state where the second switching element is turned on, based on the first pulse signal and the second pulse signal.

14. The switching power supply device according to claim 8, wherein, the state where the first timing is later than the second timing occurs when a current flowing from a secondary winding of the transformer to a load increases.

* * * * *